United States Patent [19]
Ribes

[11] 3,939,304
[45] Feb. 17, 1976

[54] DECOMMUTATOR FOR EXTRACTING ZERO AND ONE BITS FROM A CODED MESSAGE OF DURATION-MODULATED PULSES

[75] Inventor: Andre Auguste Ribes, Toulouse, France

[73] Assignee: Centre National d'Etudes Spatiales, Paris, France

[22] Filed: Jan. 30, 1975

[21] Appl. No.: 545,743

Related U.S. Application Data

[63] Continuation-in-part of Ser. No. 321,968, Jan. 8, 1973, abandoned.

[30] Foreign Application Priority Data

Jan. 7, 1972 France .......................... 72.00456

[52] U.S. Cl. ................. 178/68; 325/38 R; 325/321; 329/106
[51] Int. Cl.² ......................................... H04L 15/00
[58] Field of Search ................. 325/38 R, 321–325; 178/68.88; 328/109, 111, 117, 119, 127; 329/106, 107; 307/232, 234; 179/15 AW, 15 BA; 340/167 A, 206

[56] References Cited

UNITED STATES PATENTS

| | | | |
|---|---|---|---|
| 3,268,824 | 8/1966 | Hinrichs et al. | 325/323 |
| 3,461,389 | 8/1969 | Whalen | 328/109 |
| 3,548,327 | 12/1970 | Vermeulen | 307/232 |
| 3,626,298 | 12/1971 | Paine et al. | 325/38 R |
| 3,789,303 | 1/1974 | Hoffman et al. | 325/321 |

Primary Examiner—Benedict V. Safourek
Assistant Examiner—Jin F. Ng
Attorney, Agent, or Firm—A. W. Breiner

[57] ABSTRACT

Decommutator operating on a coded message formed of duration-modulated pulse trains, whereby extraction of the logic signal corresponding to an information is effected by comparing the pulse integrated over the information-characterizing portion of its duration with a reference quantity obtained locally by integrating the pulse over a portion of its duration not characterizing said information, this comparison having for effect to establish the reference voltage threshold of a synchronizing bit that identifies the latter.

6 Claims, 13 Drawing Figures

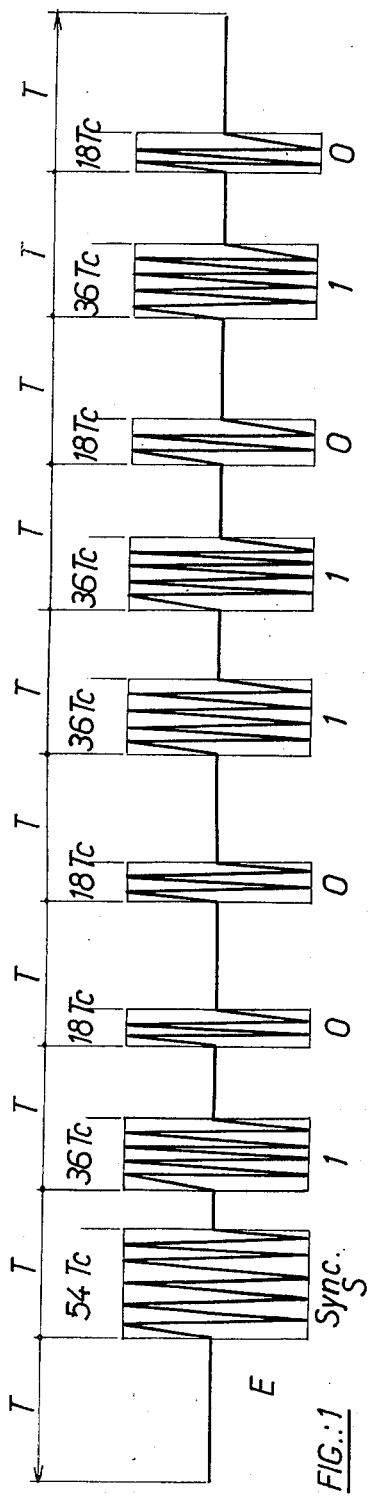
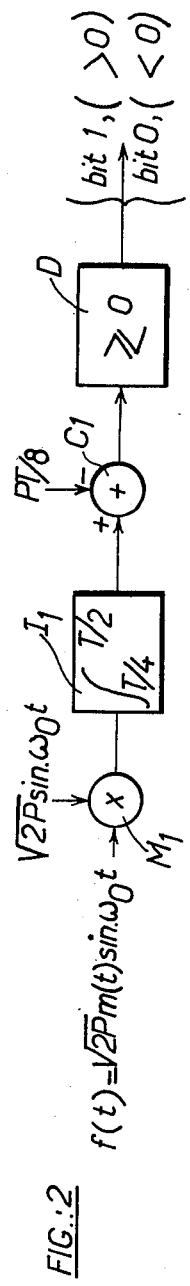
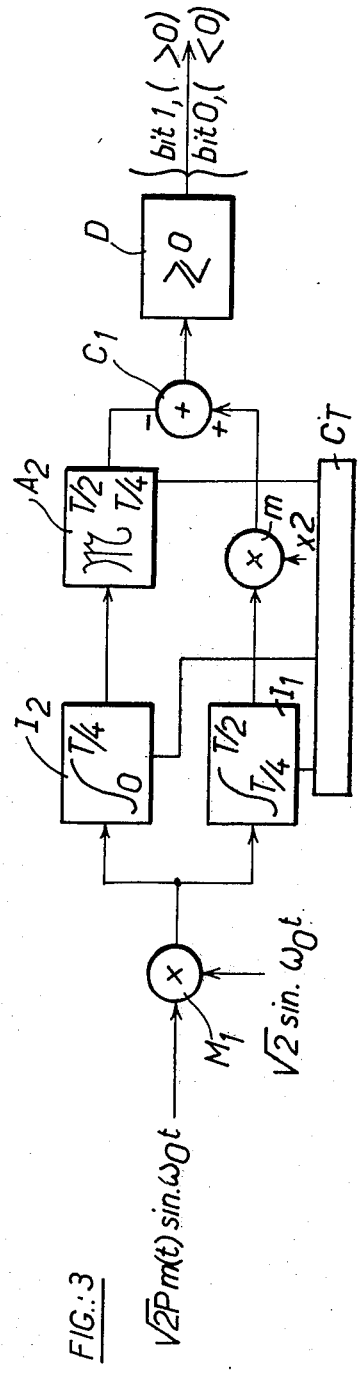

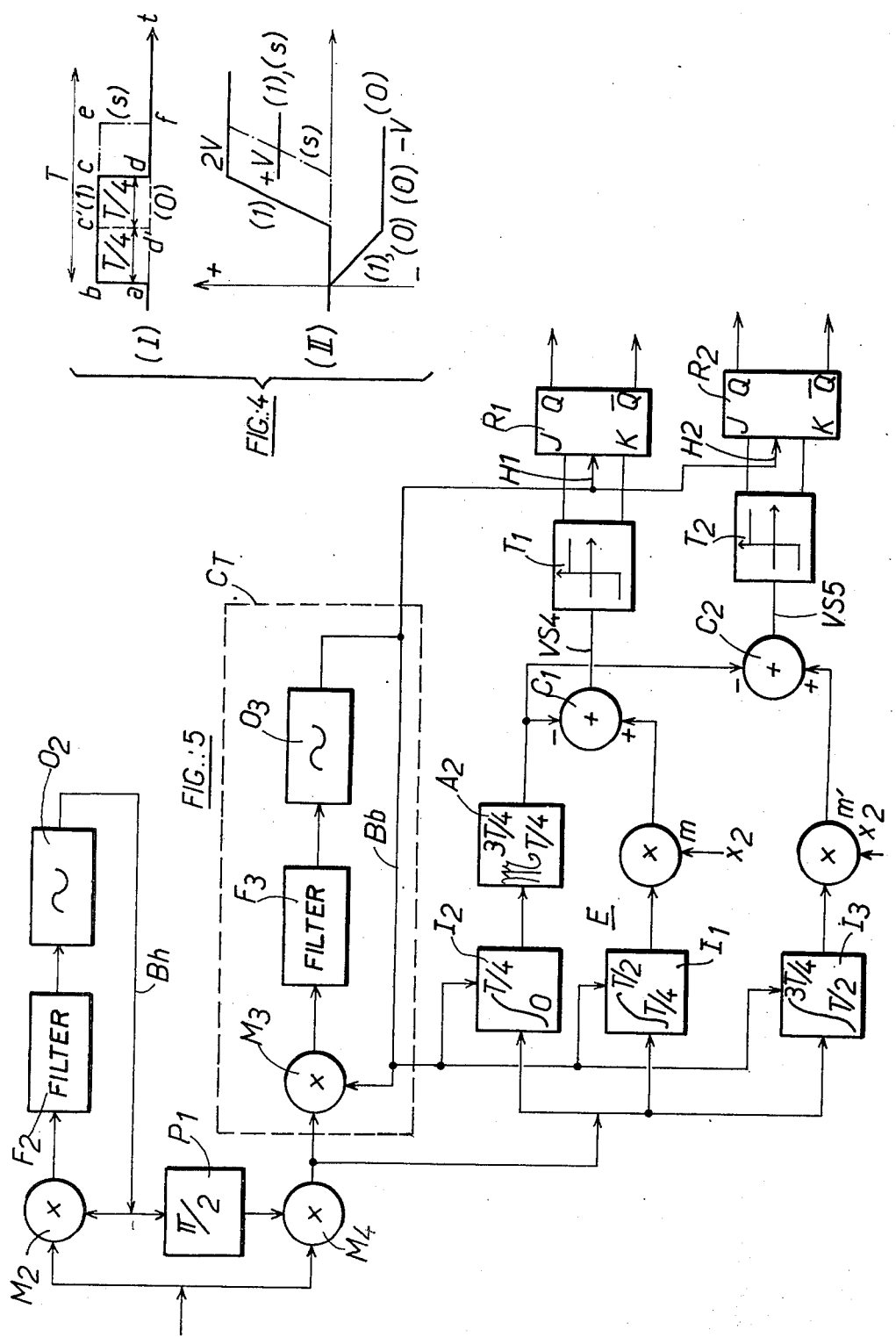

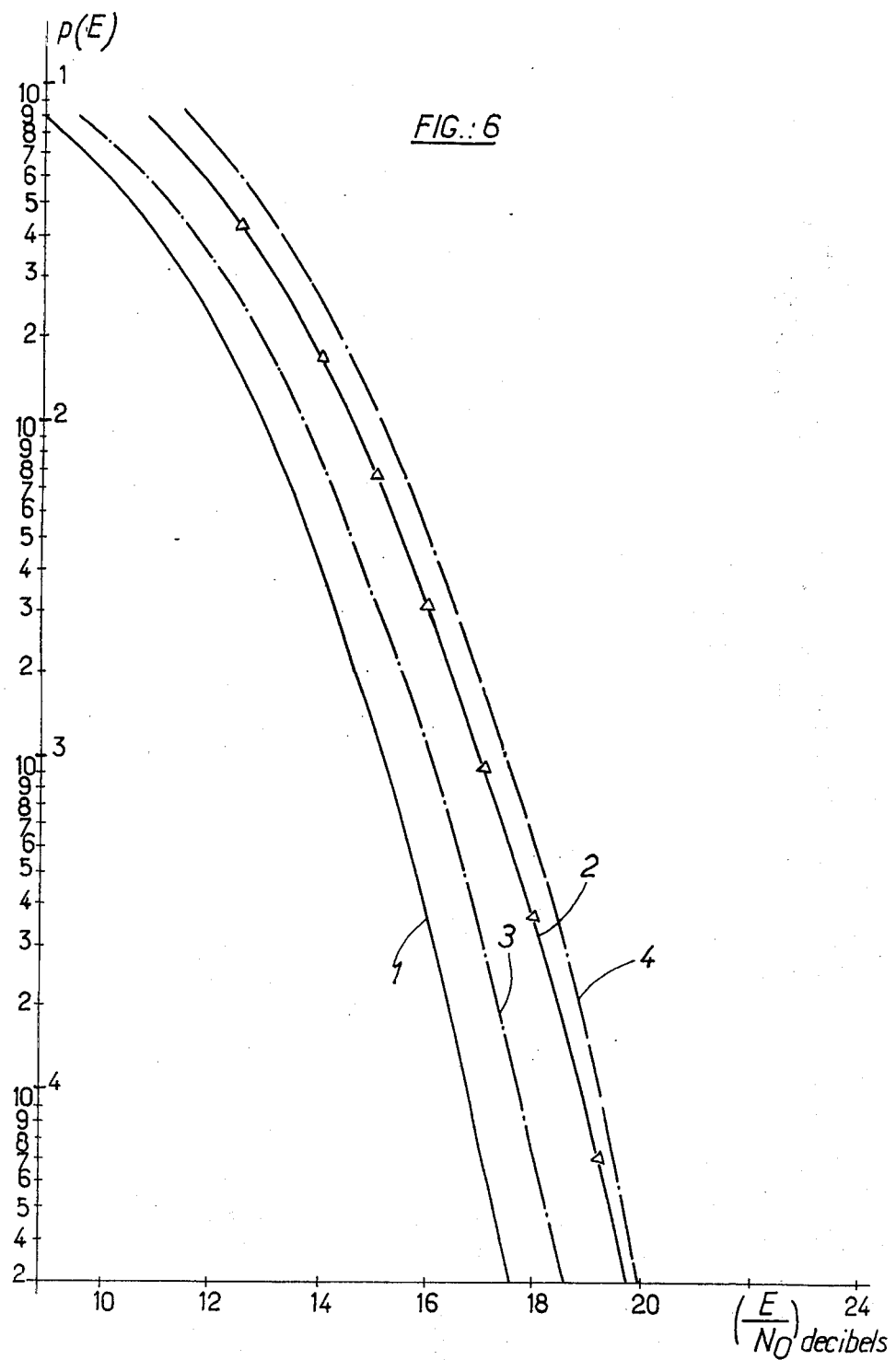

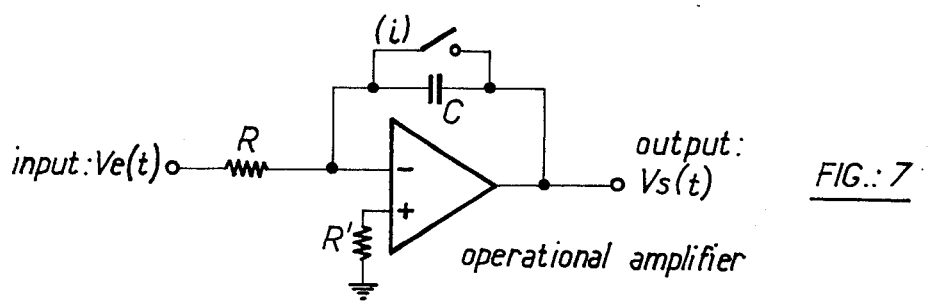
FIG.: 7
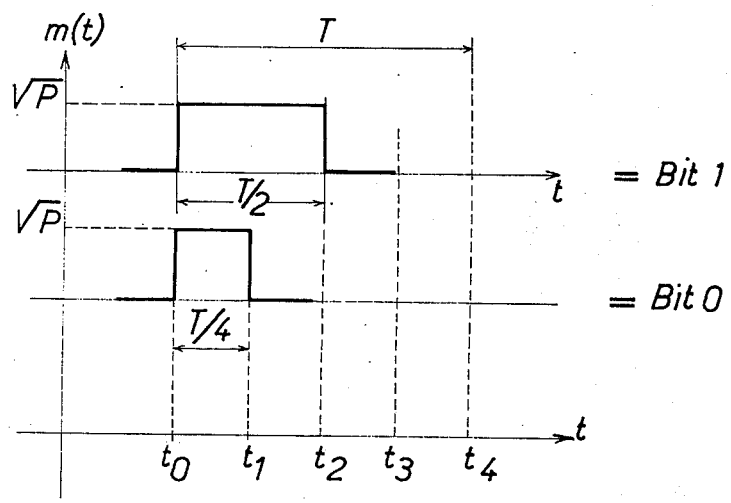
FIG.: 12
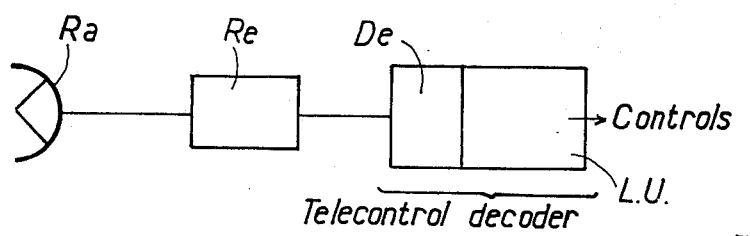
FIG.: 13

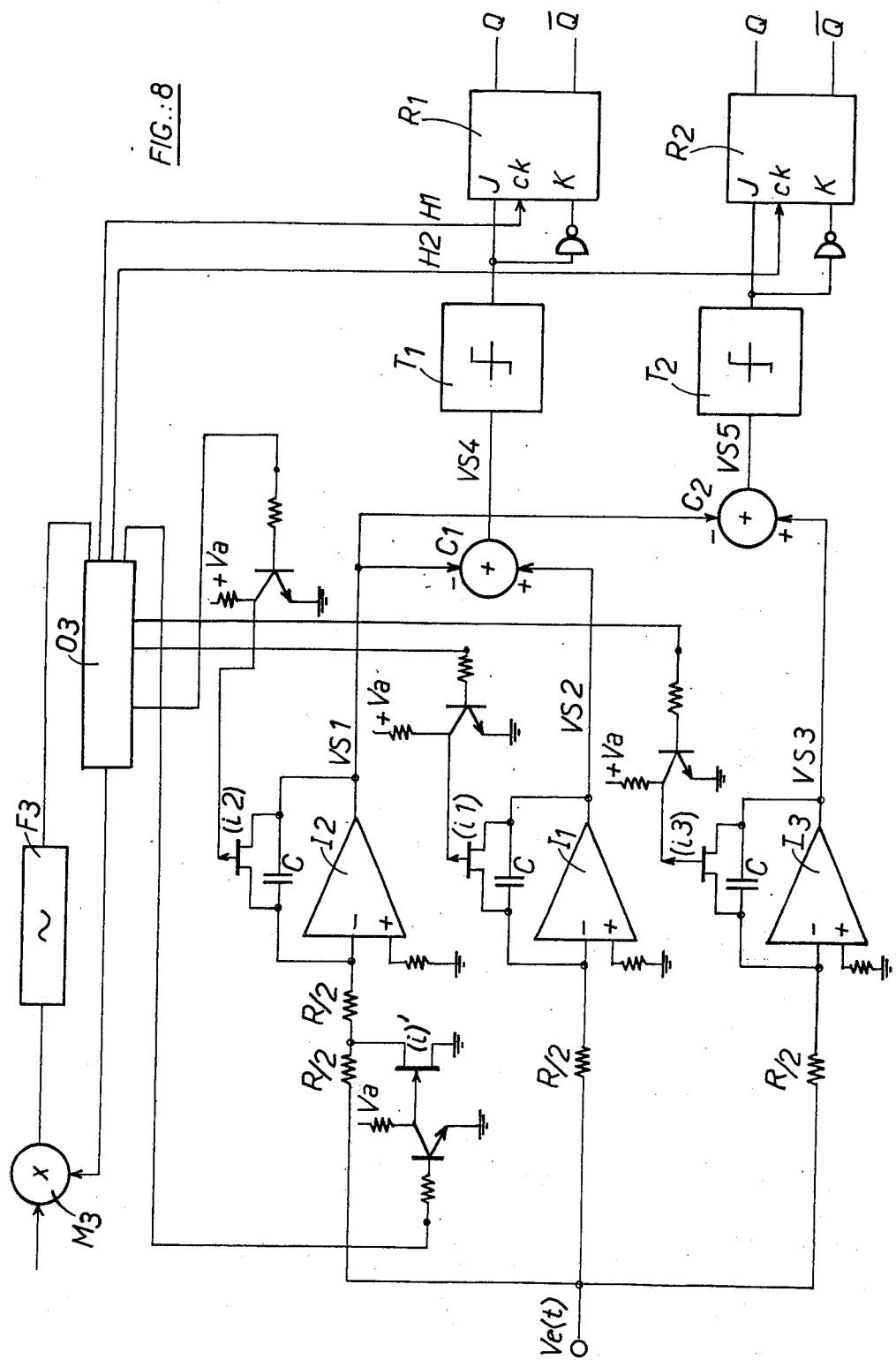

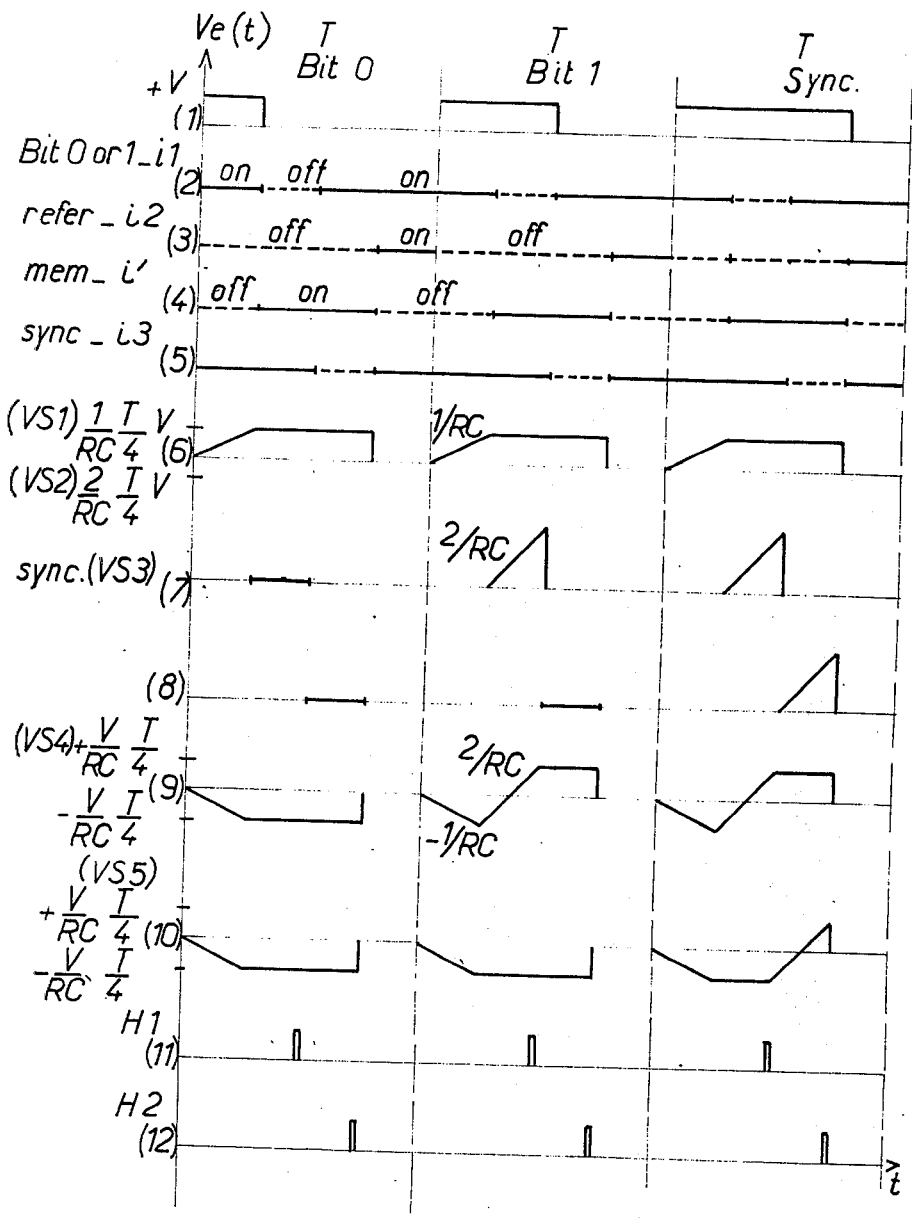

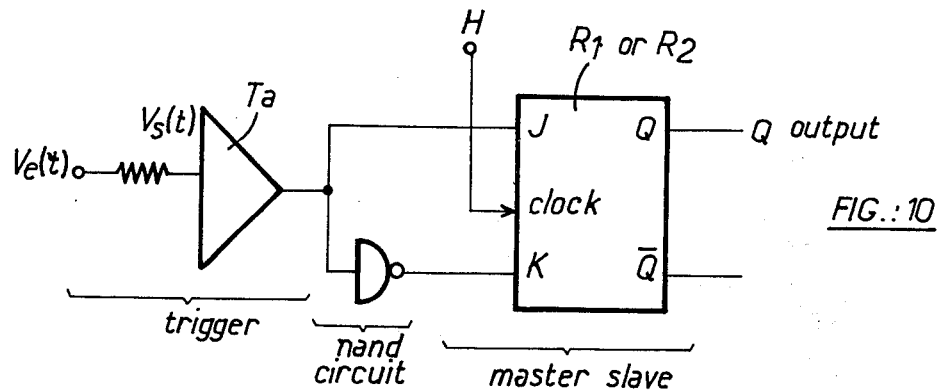
FIG.: 10
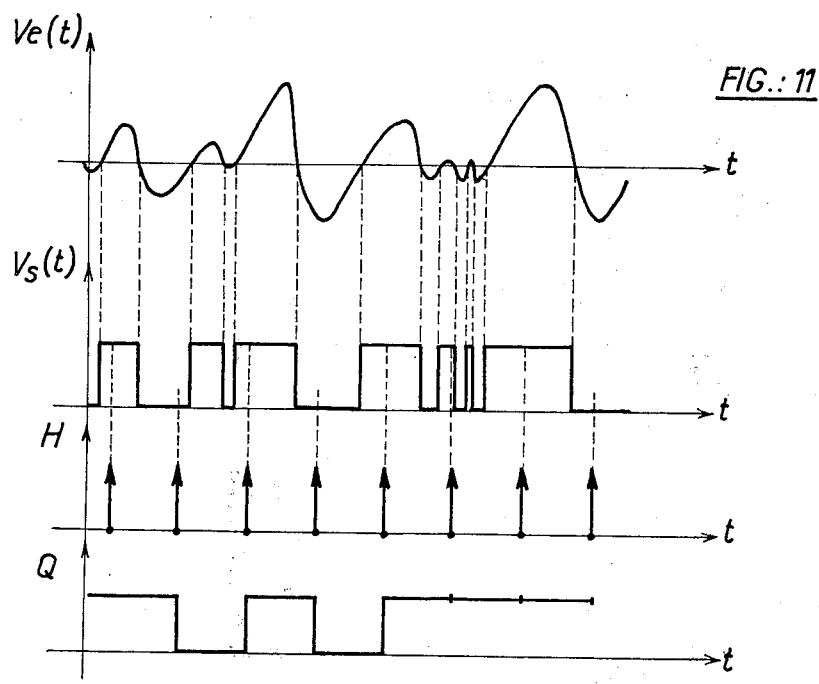
FIG.: 11

DECOMMUTATOR FOR EXTRACTING ZERO AND ONE BITS FROM A CODED MESSAGE OF DURATION-MODULATED PULSES

This is a continuation-in-part of my co-pending application Ser. No. 321,968 filed Jan. 8, 1973, now abandoned.

The present invention relates to the radio communications art and more particularly to a decommutator for remote-control applications or the like, operating on a coded message formed of duration-modulated pulse trains, that is to say that the starting points in time of the consecutive pulses (representing either 0 or 1 "bits" or synchronizing signals) are evenly spaced (at a pace determined by the transmission "clock") and their length varies according to the information (0 or 1 or "sync") in each specific pulse.

In a more general manner the invention is concerned with a decommutator remotely energized by trains of duration-modulated pulses of a conventionally coded message in which the initial instants of the pulses are evenly spaced over a time period T and the length of which varies according to the information contained in the pulse, said pulses being first detected before being applied to the decommutator as will be explained further on. However, in order to fix ideas and as an example of practical application, it is proposed to consider herein for instance a message of the so-called Tone Digital Command Standard (TDCS) type used by NASA and European countries for remotely controlling scientific satellites. Although this "standard" is well known to the specialist in the art, its particularities are recalled in FIG. 1 by means of a "word" transmitted over a microwave link in accordance with the convention chosen in this case and consisting of the following in succession:
- a space E,
- a synchronizing pulse S, and
- a sequence of eight information bits 1 0 0 1 1 0 1 0.

The initial instants in time of the synchronizing pulses (hereinafter called "sync pulses") or bits and spaces define the clock frequency $f$; hence these consecutive instants in time are spaced in time by a period $T = 1/f$. Disregarding the spaces (during which no information is transmitted), the sync pulses and the bits are modulated by a subcarrier frequency $F$ chosen as a whole multiple of the clock frequency $f$. In the standard considered herein ($F = 72 f$), it will be manifest that since a 1 bit has a length of 36 oscillations, it corresponds to a duration $T/2$; similarly, an 0 bit has a length of 18 oscillations and corresponds to $T/4$, while the sync pulse has a length of 54 oscillations and corresponds to $3 T/4$ (these numbers of oscillations are not shown on the figure).

Thus in a message consisting of synchronizing pulses and bits duration-modulated in this way, it will be noted - disregarding the spaces - that the first quarter of the pulse train provides no indication about its information content; it is therefore not characteristic of the associated information (nature or value). Only from the second and/or third quarter of the period T is there any information available about the data in question.

A major difficulty in designing a decommutator intended for operation on a spacecraft and adapted to restore the initial information arises from the fact that the useful information formed by the different digits is buried in thermal noise that can be assumed to be white and Gaussian. Further, the useful power received can vary within farily wide limits, depending on the distance between the earth-transmitter and the spacecraft and on the latter's orientation.

Prior art decommutators designed for operation with a message of the TDCS type or the like having the disadvantage of producing too high a proportion of errors in the recognition of 0 and 1 information bits. This is due in part to the fact that they usually operate with diode-type clamping systems, that is with non-linear elements that modify the noise distribution law - making it no longer Gaussian - thereby hindering proper operation of the decomutator by reason of the significant degradation in bit error probability for a given input signal/noise ratio. This in turn requires a big increase in transmitter power to obtain a given result.

Clearly, the performance of the onboard decommutator is of paramount importance in command links with ballistic missiles, bearing in mind the magnitude of and variations in the distances involved and the noise environment in which such missiles operate.

Now it has been found that it is possible to greatly mitigate the drawbacks of distance variations by making use of the information characterizing portion of the pulse as well as of its non-characteristic portion.

A decommutator according to this invention is accordingly so devised that extraction of the logic signal (0, 1 or "sync") corresponding to a certain information is effected by comparing the pulse - integrated over a portion of its duration characterizing its information content - with a reference value obtained locally by integrating the pulse over a portion of its duration that is not characteristic of that information, said comparison being performed with means the effect of which is to establish at zero magnitude the threshold of the reference voltage of a bit or sync pulse whereby to decide upon the nature or value thereof. Performed in this way, such comparison completely circumvents variations in dynamic range of the input signal.

Detection of the 0 and 1 bits and restitution of the sync pulses can therefore be effected in this manner, and this in spite of the noise. Further, it is highly advantageous in such cases to demodulate the oscillations of the subcarrier by a coherent envelope detection rather than by detection utilizing diodes.

It is to be noted that although the subject decommutator of this invention will function likewise without utilizing a coherent detector for the desired application - i.e. using instead a system of diodes or the like - the results obtained are less satisfactory; indeed it has been recognized that performance coming as close as is practically possible to the maximum theoretical performance can ba achieved only with a combination suitably adapted to the decommutator structure as hereinbefore described, including comparison with a reference quantity, and a coherent envelope detector.

The invention will be more clearly understood from the description which follows with reference to the accompanying non-limitative examplary drawings in which, in addition to FIG. 1 mentioned proceedingly, FIG. 2 is a schematic diagram showing the arrangement of the decommutator;

FIG. 3 is a block diagram of the fundamental element in a decommutator according to this invention;

FIG. 4 shows the corresponding graphs;

FIG. 5 is a general block diagram of a decommutator according to this invention;

FIG. 6 shows the error probability curves obtained with a system according to this invention;

FIG. 7 shows the diagram of an operational amplifier;

FIG. 8 shows diagrammaticaly the association of three operational amplifiers for the use of the invention;

FIG. 9 is a time diagram corresponding to FIG. 8;

FIG. 10 shows the possible embodiment of the combination $T_1$-$R_1$, or $T_2$-$R_2$ of FIG. 5, while FIG. 11 is a corresponding time diagram;

FIG. 12 illustrates the shape of the bits 1 and 0 with respect to time and

FIG. 13 shows the general constitution of an equipment for receiving TDCS signals at a distance.

It is proposed to consider the case of a missile or spacecraft receiving from earth TDCS-coded remote-control signals which are amplitude-modulated on a suitable carrier wave. The missile or spacecraft will accordingly include the following on board equipment (see FIG. 13).

A receiving antenna Ra for collecting the signals sent from the earth.

A receiver Re connected thereto for performing the first (amplitude) demodulation. The receiver delivers the high frequency signal buried in the noise produced by the link - thermal noise or celestial noise and electronic noise from the receiver - the latter noise being preferably reduced as much as possible.

A decommutator De which is the object of the invention; it receives the high frequency signal and decommutates it, i.e. delivers binary-type signals which, subsequent to conversion in a logic unit L.U., can directly operate the controls of the spacecraft in the form of relays. As already stated, this invention is primarily concerned with the decommutator itself and not with the other elements of this FIG. 13.

The function of the decommutator is to convert 0 and 1 bits, coded according to the TDCS standard and carried by a certain subcarrier frequency, into a train of "Non return to Zero" (NRZ) type signals rid of noise and devoid of a subcarrier frequency, and hence directly ingestible by the logic unit.

It is pointed out for the record that with NRZ type signals the full period of a bit constitutes the information support. For example, a 1 is represented by a first level (high) and a zero by second level (low) and there is a transition each time the bit changes state (from 0 to 1 or from 1 to 0).

The additional noise in the message causes a degradation of the signal which produces "bits errors" (transformation of a 0 into a 1 and vice versa) in the decommutator. It will readily be appreciated therefore just how useful and important it is for the decommutator to be so devised that these errors are reduced to a minimum and that the corresponding error probability curve comes as close as possible to the theoretical mathematical curve characterizing the form of coding utilised.

A TDCS pulse train can be written as a function of time $t$ in the form:

$$f(t) = \sqrt{2P} \sin \omega_o t \cdot m(t)$$

where P is the power of the sine signal, $\omega_o$ the radian frequency of the subcarrier and $m(t)$ a function of time representing a subcarrier modulating signal (consisting of a periodic portion and a random portion).

To decode the 0 and 1 bits in a TDCS pulse train, it is possible, at any rate theoretically, to use a device devised according to the diagram in FIG. 2. The input signals $f(t)$ are applied to a multiplier the other input of which receives sinusoidal clock signals (in the form $\sqrt{2P} \sin \omega_o t$). A coherent envelope detection is thus performed on the input signals and the bits resulting from this detection are applied to an integrator $I_1$, which integrates between T/4 and T/2 over that portion of the period which characterizes the digit 1. The output signals are applied to a subtractor $C_1$ which receives the reference term P.T/8, and thereafter to a bit detector D that is known per se, The reference term PT/8 is obtained by integrating the bits 0 and 1 during the first fourth part of a pulse. It is in fact necessary to obtain locally a reference quantity and for this purpose the pulse is integrated over a portion of its duration ($t_0$–$t_1$) which does not characterize the information. If time is marked on the abscissa axis, and $\sqrt{P}$ (= squ. root of the signal power) on the ordinate axis, the bits 1 and 0 are represented as indicated in FIG. 12.

There is in either case a signal occurring in the interval $t_1 - t_2$ and consequently an integrator working over this interval will deliver a voltage proportional to the quantity PT/8, which represents half the energy transported by the first fourth part of any bit received. Then the object of introducing the term P.T/8, in the case of the standard considered herein, is to define a "decision" threshold which establishes itself at the middle value of the voltages representing the 0 and 1 bits at the end of integration, whereby to determine these bits.

This quantity PT/8 is necessarily a function of the power P and if the latter varies, there must be some means for exerting a corresponding action on the threshold. Actually, if such means were not provided, the decision threshold could be no more equal to the arithmetic mean value of the levels obtained when receiving a bit "1" and a bit "0"; consequently a degradation of the probability of bit error would take place, one kind of bit being disadvantaged with respect to the other. Thus, the power P has to be measured aboard the satellite and the result of this measure has to influence the decision threshold.

The decommutation device of FIG. 2 could permit the attainment of the theoretical maximum performance of the system, but it has the serious drawback of depending on the power P of the signal received. In other words, it would be necessary to operate with a fully known input-signal dynamic range, which is not feasible in the case of the earth-spacecraft links considered herein.

A decommutator according to the invention as represented in FIG. 3, which is based solely on the permissible assumption that the input-signal dynamic range has no time to change significantly over a time lapse of the order of T/4 (i.e. about 2 ms in practice), makes it possible to circumvent the above-mentioned drawback thanks to another arrangement.

In brief, whereas the device shown in FIG. 2 operates with a fixed threshold, the one in FIG. 3 operates with a referenced and slightly noise-afflicted threshold. In the latter arrangement, the demodulating multiplier $M_1$, which receives the input signal, simultaneously feeds two chains in parallel. The upper chain includes, in series, an integrator $I_2$ operating from 0 to T/4, followed by a memory (or gated storage element $A_2$ which stores the integrated signals only for a further quarter-period. The lower chain comprises in series the integrator $I_1$ effective from T/4 to T/2 and a doubler $m$. The signals issuing from the units $A_2$ and $m$ are inputted simultaneously into subtractor $C_1$ followed by bit detector D.

Means $C_T$ are provided for controlling the integration times of the integrators and the storage time of memory $A_2$ during the period T. Such means will be better defined with respect to FIGS. 5 and 8.

The role of the doubler $m$ is to obtain at the output of subtractor $C_1$ symmetrical signals with respect to earth, although a bit 0 has a T/4 duration and a bit 1 a T/2 duration. Thus, the operation is independent of the level of the signal received, which is very important for the usage in view.

It is to be understood that FIGS. 3 and 5 are but theoretical schematic diagrams, which are to be completed as indicated further on.

FIG. 4 illustrates the working of the device. On the line I, a bit $a-b-c-d$ of value 1 is shown is solid lines and a bit $a-b-c'-d'$ of value 0 in dot-dash lines (which bits are detected by $M_1$), and on the facing line II are represented the voltages developed after integration. At the end of the first quarter-period, there is formed in the upper chain a negative voltage of value $-V$ which is stored without notable loss in the memory $A_2$ for the next quarter-period. In the case of a 1 bit, integration is also effected in the lower chain, over the second quarter-period only, and a $+2V$ voltage is obtained by means of doubler $m$. A zero voltage is obtained in the case of a bit of value 0.

In other words, the bit detector D has to work with voltages of the same value and opposed signs, for the digital bits (1) and (0).

In the presence of a bit 1, which lasts T/2, the upper branch of the circuit (FIG. 3) delivers a voltage $+V$, obtained during the first T/4 and the lower branch of the same circuit delivers a voltage $+2V$, because of the doubler (otherwise this would be only V, obtained in the second T/4); the net result obtained at the output of the subtractor $C_1$ is $+2V - V = +V$.

In the presence of a bit 0, which lasts T/4, the upper branch of the circuit only works and the subtractor $C_1$ delivers a voltage V.

Thus if one disregards the noise (which in practice operates only in a ratio of about 3 dB), one obtains equal voltages, of opposite sign, irrespective of the value of V, which voltages are readily exploitable in the bit detector.

FIG. 5 is an overall block diagram of a decommutator according to the invention that basically comprises:

a loop $B_h$ phase-referenced to the subcarrier frequency (called the "upper" loop) and forming a coherent-detection unit for restituting the envelope $m(t)$;

a "low" loop $B_b$ for restituting the bit rate, providing the controlling means $C_T$, and a decommutator and bit detection unit E which utilizes the signals issuing from said two loops and is devised in accordance with the principle illustrated in FIG. 3 for restituting the 0, 1 and sync signals in the TDCS pulse train.

Considering first the upper loop, the latter is a conventional device comprising, subsequent to a multiplier $M_2$, a loop filter $F_2$ and an oscillator $O_2$ of the voltage-controlled type that controls the second input to multiplier $M_2$ (possibly via a logic divider, depending on the oscillator frequency). This loop $B_h$ permits coherent detection of the envelope of the incoming signal, i.e. restitution of the pulse trains. The element for ensuring synchronous amplitude demodulation is made of the phase-shifter $P_1$ and the multiplier $M_4$: the output of $M_4$ provides the input signal for the low loop $B_b$ and the analog portion E of the decommutator.

The low loop $B_b$ is devised somewhat similarly to the upper loop $B_h$ (multiplier $M_3$, filter $F_3$, oscillator $O_3$) and is referenced to the periodic portion of the signal characterizing the bit rate, for it has been observed in developing the present invention that the spectrum of the random pulse train contains discrete lines characterizing the clock frequency of the bits. It is therefore possible to reference a phase loop to this periodic component for the purpose of delivering the different control signals at the required instants in order to activate the integrators $I_1$, $I_2$, $I_3$. It is recalled that the loop Bh is outside the scope of the invention and commented only for explaining the use of the decommutator.

The decommutator unit proper E includes firstly the two chains $I_2-A_2$ and $I_1-m$ described precedingly with reference to FIG. 3. These chains drive a trigger circuit $T_1$ followed by a logic copying device $R_1$ which delivers the 0 and 1 signals.

By trigger circuit ($T_1$ or $T_2$) as is meant here, is a circuit understood whose output may have only two values, 0 and $V_1$. The value O is obtained when the input voltage is negative or nil, and the value $V_1$ when the input voltage is positive. For instance one may use therefor an amplifier $T_a$ having a very high gain ($>10^5$) (see FIGS. 10 and 11).

This trigger circuit is followed by a logic copying device ($R_1$ or $R_2$); this is a bistable flip-flop, called "master slave" and known under type 54 L 73 of Texas Instrument Corp. (U.S.A.), this flip-flop being rhythmed by a clock at definite instants so as to take off the information existing on the flip-flop inlets at said instants. Thus the combination $T_1-R_2$ or $T_2-R_2$ (known in itself) will take the form of FIG. 10.

To obtain the sync signals (s) of the form $a-b-e-f$ (line I of FIG. 4), use is made of the upper chain $I_2-A_2$ in cooperation with an additional lower chain $I_3-m'$ similar to $I_1-m$ that operates on a comparator $C_2$, the integrator $I_3$ integrating from T/2 to 3T/4. It is recalled that the sync digit differs from a 1 by the presence of a signal in the time interval T/2 – 3T/4, but they have in common the reference signal in the time interval 0-T/4. For obtaining the sync digits it would be possible to use a supplemental two-chains lay-out similar to the one of FIG. 3, but in order to spare one memory element (as $A_2$) it suffices to have in FIG. 5 a supplemental $I_3-m'$ chain and to extend the memorization of the output of $I_2$ — (from T/2 to 3T/4) so as to obtain sync information also (in addition to the bits 1 and 0). The elements $R_1$ and $R_2$ are used for distinguishing with reference to time the two kinds of bits — sync or 1-0 — thanks to different sampling instants — either at T/2 or at 3T/4. The dot-dash lines in FIG. 4 (line II) illustrate the variation in potential in the lower chain, and the manner of production of the sync signals will readily be understood by comparison with the production of the 0 and 1 bits. These signals (s) are also produced by a trigger circuit $T_2$ and a logic copying device $R_2$.

The detected ones, zeros and the sync are to be used in the logic unit L.U. (FIG. 13) which works on the respective situations of the bits in the message; it is recalled that this unit lies outside the scope of the invention. The decommutator of the invention plus said logic unit constitute what is in itself known, under any other form, as a "telecontrol decoder" which delivers the orders to the satellite for ensuring its proper working.

FIG. 6 indicates the error probability curves plotted with such a device, which highlight the qualities of the latter. On this figure, the X-axis represents, in decibels, the ratio $E/N_o$ of the mean energy E emitted per bit to the spectral noise density $N_o$ (assumed to be white and Gaussian), and the Y-axis is a logarithmic representation of the bit error probability $p(E)$, the bits being assumed to be equiprobable and independent.

Curve 1 gives the bit error probability obtained with a decommutator according to the invention, the integrator control signals of which are devoid of noise (loop $B_b$ of infinitely narrow bandwidth), and curve 2 the bit error probability obtained under the same conditions but with noiseafflicted control signals. The latter curve is plotted by taking the arithmetic mean of the points on the same vertical for curves 3 and 4, for the "1" and "0" probabilities (taken separately) respectively.

It must be clear that in the above cited diagrams the integrators and the memory could be of various types. However, the best way for putting the invention into practice will be given hereinafter. The type of integrator $I_1$, $I_2$, $I_3$ preferably chosen in FIGS. 3 and 5 is a well-known operational amplifier, which is provided with a switch (i) and a condenser C across the amplifier as shows the circuit diagram of FIG. 7. Its transfer function in the Laplace's sense is:

$$H(p) = \frac{V_s(p)}{V_e(p)} = \begin{cases} \frac{1}{RCp} \text{ for Integrator } I_2 \\ \frac{2}{RCp} \text{ for Integrators } I_1 \text{ and } I_3 \end{cases}$$

$V_s(p)$ and $V_e(p)$ being the respective Laplace transformations of the corresponding output and input signals $V_s(t)$ and $V_e(t)$ and R or R/2 the input resistance. It is seen that the Laplatian operator p is situated in the denominator of the term H (p).

The condenser C connected with the switch (i) across the amplifier ensures integration. When the switch (i) is closed, it shortens condenser C and thus fixes the integration limits in the course of time. It is obvious that this circuit acts as an integrator if and only if (i) is opened. Mathematically this may be written as follows:

$$V_s(t_2, t_1) = \int_{t_1}^{t_2} V_e(t) \, dt$$

with $t_1 - t_2$ = time interval during which (i) is open.

In a practical embodiment of the invention the Applicant will use, for materializing the integrators $I_1$, $I_2$, $I_3$ of FIG. 5, the structure shown in FIG. 7. It is thus contemplated to go a step further and to embody in a single unit $I_2 + A_2$, and also $I_1 + m$ and $I_3 + m'$ respectively. In this manner the diagram of FIG. 8 is obtained.

It is clear that an electrical integrator, as it includes a condenser or any other like capacitive element, is in itself a storage element. The pulse part which is integrated is stored in this condenser. All that is required to transform it into a "gated" storage element is to provide an input switch or gate which is open and closed at the required instants. This switch $i'$ is made, as in current practice, of a FET (field effect transistor). The switches $i_1$, $i_2$, $i_3$, corresponding to switch $i$ of FIG. 7, are preferably also of the same FET type. Each of the switches is controlled by a conventional transistor stage.

It will be remarked that at the input of $I_2$ a resistor of value $R/2 + R/2 = R$ (identical to the one of FIG. 7) is connected in series, whereas the resistor has a value $R/2$ at the inlet of $I_1$ and $I_3$. It results that the two latter integrators will act also as doublers, for the slope of integration is a reverse function of this resistor value. Moreover, switch $i'$ is connected at the mid-point of the two resistors R/2 for avoiding reactions of $I_2$ on the integrators $I_1$ and $I_3$.

In order to understand perfectly the working of FIG. 8 one may refer to the time diagram of FIG. 9. In this time diagram there are to be found successively from top to bottom:

line (1): the shape of a bit 0, a bit 1, a sync bit versus time t.

lines (2), (3), (4), (5) the periods "on" and "off" of the switches $i_1$, $i_2$, $i'$, $i_3$ respectively during this time.

line (6), the integration of the non-characterizing part of the pulses, common to all kinds of bits, which is obtained in the chain $I_2$–$A_2$.

line (7), the integration with doubling in the chain $I_1$–m.

line (8), the integration with doubling in the chain $I_3$–m'.

line (9), the net result of subtraction of the first two chains, obtained at the outlet of $C_1$.

line (10), the net result of subtraction of the first and third chains, obtained at the outlet of $C_2$ and line (11) and (12), the sampling of the respective results in $R_1$ and $R_2$.

Obtainment of the timing pulses is derived from oscillator $O_3$ through known arrangements which are usual in this technique and are outside the scope of this invention.

It goes without saying that changes and substitutions may be made in the exemplary embodiments hereinbefore described without departing from the scope of the invention. For instance, it will be manifest that dividing by two in the upper chain is virtually the same thing as multiplying by two in the lower chain (FIG. 3).

It is consequently not mandatory to confine oneself to a doubling (at m). More generally, it is necessary only that extraction of the information signal corresponding to any information type or value be effected by comparing (for the application stated precedingly) the pulse or series of rectified oscillations integrated over that portion of its or their duration which characterizes its or their information value or type, with a reference quantity obtained locally by integrating the pulse or rectified series of oscillations over that portion of its or their duration which is not characteristic of saif information value or type, said comparison being effected with means the function of which is to establish, at zero magnitude, the reference threshold needed to decide upon the nature of a bit.

What I claim is:

1. A decommutator for extracting 0 and 1 bits from duration-modulated pulses of a conventionally coded message in which the initial instants of the pulses are evenly spaced over a time period T and the length of which varies according to the information contained in the pulse, said pulses being first detected before being applied to the decommutator, said decommutator comprising a first integrator and a second integrator, means for applying the detected duration-modulated pulses conjointly to both said integrators, a gated storage element, a multiplying member having a constant multiplication factor, means for connecting the first integrator to the storage element so as to store therein the signals integrated by this first integrator, means for connecting the second integrator to the multiplying member so as to multiply the magnitude of the signals integrated in said second integrator by said constant factor, a comparison means having two inlets and one outlet, means for connecting the storage element and the multiplying member each to one different inlet of the comparison means, and means for controlling the integration intervals of the integrators and the gating of the storage element so that a said pulse is integrated in the first integrator over a period carrying no said information and stored in a succeeding portion of the same period and that said pulse is integrated in the second intergrator over a period carrying said information and multiplied by said factor, whereby the stored integrated signals and the multiplied integrated signals are compared in said comparison means for providing 0 and 1 bits, and means for connecting the outlet of said comparison means to a bit detector for detecting said 0 and 1 bits.

2. A decommutator according to claim 1 for extracting the 0 and 1 bits from a message of the TDCS type, wherein in the period T the first integrator integrates in the time interval O − T/4, the second integrator integrates in the time interval T/4 − T/2 and the storage element stores in the time interval T/4 − T/2 and wherein said multiplying element is a doubler.

3. A decommutator according to claim 1, wherein the first integrator, the gated storage element and the means for connecting the first integrator to the storage element are embodied in one single integrating and storing member.

4. A decommutator according to claim 1, wherein the second integrator, the multiplying member and the means for connecting the second integrator to the multiplying member are embodied in one single integrating and multiplying member.

5. A decommutator according to claim 1 for extracting the 0 and 1 bits and the synchronizing pulses from a message of the TDCS type, wherein in the period T the first integrator integrates in the time interval .−T/4, the storage element stores in the time interval T/4 − 3T/4 and the second integrator integrates in the time interval T/4 − T/2 and wherein said multiplying element is a doubler, said decommutator also comprising a third integrator, a supplemental doubler and supplemental comparision means having two inlets and one outlet, means for applying the detected duration-modulated pulses to the third integrator conjointly with the other two integrators, means for controlling the integration of said third integrator in the time interval T/2 − 3T/4, said means for controlling being the same means for controlling the integrating intervals of the first and second integrators; means for connecting the third integrator to the supplemental doubler so as to double the magnitude of the signals integrated in said third integrator, means for connecting the storage element and the supplemental doubler each to one different inlet of the supplemental comparison means, for providing said synchronizing pulses at the outlet of said supplemental comparison means, while the voltage at the outlet of the first mentioned comparison means corresponds to the 0 and 1 bits.

6. A decommutator according to claim 5, wherein the first integrator, the gated storage element and the means for connecting the first integrator to the storage element are embodied in an integrating and storing member, the second integrator, the multiplying member and the means for connecting the second integrator to the doubling member are embodied in a first integrating and doubling member, and the third integrator, the supplemental doubler and the means for connecting the third integrator to the supplemental doubler are embodied in a second integrating and doubling member.

* * * * *

UNITED STATES PATENT AND TRADEMARK OFFICE
CERTIFICATE OF CORRECTION

PATENT NO. : 3,939,304
DATED : February 17, 1976
INVENTOR(S) : Andre Auguste RIBES It is certified that error appears in the above–identified patent and that said Letters Patent are hereby corrected as shown below:

Column 4, line 15, "and" should read -- or --;

Column 4, line 67, after "element" insert -- ) --;

Column 7, line 18, "noiseafflicted" should read -- noise-afflicted --;

Column 9, claim 1, line 16 should read -- integration intervals of the integrators at different times and for controlling the gating of --;

Column 10, claim 5, line 6, ".-T/4," should read " O-T/4, --;

Column 10, claim 5, line 19, "integrators; means" should read -- integrators means --.

Signed and Sealed this

Seventeenth Day of May 1977

[SEAL]

Attest:

RUTH C. MASON
*Attesting Officer*

C. MARSHALL DANN
*Commissioner of Patents and Trademarks*